United States Patent [19]

Yamasaki et al.

[11] Patent Number: 5,268,198

[45] Date of Patent: Dec. 7, 1993

[54] WATER-REPELLENT METAL OXIDE FILM COATED ON GLASS SUBSTRATE AND METHOD OF FORMING SAME

[75] Inventors: Seiji Yamasaki; Kensuke Makita; Hiroshi Inaba, all of Matsusaka, Japan

[73] Assignee: Central Glass Company Limited, Ube, Japan

[21] Appl. No.: 865,449

[22] Filed: Apr. 9, 1992

[30] Foreign Application Priority Data

Apr. 26, 1991 [JP] Japan ................................. 3-96837

[51] Int. Cl.$^5$ ............................................. B05D 3/02
[52] U.S. Cl. ................................... 427/226; 65/60.2; 65/60.3; 65/60.52; 65/60.53; 427/380; 427/407.2; 427/419.2; 427/419.8
[58] Field of Search ............... 65/60.2, 60.3, 60.52, 65/60.53; 427/380, 376.2, 226, 228, 419.2, 419.8, 407.2

[56] References Cited

U.S. PATENT DOCUMENTS

| | | | |
|---|---|---|---|
| 4,129,434 | 12/1978 | Plumat et al. | 65/60.3 X |
| 4,812;332 | 3/1989 | Kerherve et al. | 65/60.52 X |
| 4,857,095 | 8/1989 | Brown | 65/60.3 |
| 4,995,893 | 2/1991 | Jenkins et al. | 65/60.2 X |

FOREIGN PATENT DOCUMENTS 48-42350 12/1973 Japan.
1-246160A 10/1989 Japan.

*Primary Examiner*—Michael Lusignan
*Attorney, Agent, or Firm*—Keck, Mahin & Cate

[57] ABSTRACT

The disclosure relates to a metal oxide film formed on a glass substrate by the sol-gel process using an alcohol solution of at least one metal alkoxide or acetylacetonato. To afford water repellency to the oxide film, carbon fluoride is dispersed in the metal oxide matrix by thermal decomposition of a fluoroalkylsilane compound, e.g. $CF_3(CF_2)_3CH_2CH_2Si(OCH_3)_3$. An organic polymer, e.g. polyethylene glycol, is dissolved in the metal alkoxide or acetylacetonato solution, and the solution is applied to the glass substrate to form a sol film. By heating at a temperature not higher than 200° C. the sol film turns into a porous gel film. Next, the porous gel film is impregnated with an alcohol solution of the fluoroalkylsilane compound and then heated at a temperature not lower than 500° C. The obtained oxide film is good in durability and abrasion resistance, and on this film the contact angle of water drop becomes greater than 90 degrees.

13 Claims, No Drawings

WATER-REPELLENT METAL OXIDE FILM COATED ON GLASS SUBSTRATE AND METHOD OF FORMING SAME

BACKGROUND OF THE INVENTION

This invention relates to a water-repellent metal oxide film coated on a glass substrate and a method of forming the film. The film forming method belongs to the sol-gel process using a solution of a metal alkoxide or acetylacetonato. The water-repellent coating is suitable for application, for example, to architectural and vehicular window glasses to be exposed to rain water.

It is well known to coat a glass plate surface with a transparent, hard and abrasion-resistant film of a metal oxide such as, for example, oxide of silicon, titanium and/or zirconium. The metal oxide film can be formed by either a physical vapor deposition method or a sol-gel method using a solution of an organic metal compound such as alkoxide. When the coated glass plate is for use as an architectural or vehicular window glass often it is desired that the coating be repellent to water. However, with the conventional metal oxide coatings the contact angle of water drop hardly exceeds about 40 degrees.

JP 1-246160 A, which relates to an insulated glass panel constructed by confining dry gas between two opposite glass plates, mentions that a silicone coating film formed by the application of a silicon alkoxide solution exhibits water repellency. However, the water repellency of such a silicone film is only to a slight degree though it may be appreciable in respect of an antidimming effect.

JP 48-42350 shows to form a water-repellent film of a partially decomposed polyfluoroolefin by vacuum evaporation of poly(fluoroethylenepropylene). This film is formed of an organic material and hence is insufficient in durability and abrasion resistance particularly for outdoor uses.

SUMMARY OF THE INVENTION

It is an object of the present invention to provide a durable and water-repellent coating film, which is basically a metal oxide film, on a glass substrate.

It is another object of the invention to provide a method of producing a durable and water-repellent metal oxide film on a glass substrate by the sol-gel process.

The present invention provides a water-repellent metal oxide film coated on a glass substrate, the film comprising a metal oxide matrix which is formed by thermal decomposition of at least one organic metal compound selected from metal alkoxides and metal acetylacetonatos, and carbon fluoride which is dispersed in the metal oxide matrix.

According to the invention a method of forming the above stated water-repellent metal oxide film comprises the steps of (i) applying a first solution, which is a solution of at least one metal oxide precursor selected from metal alkoxides and metal acetylacetonatos and an organic high molecular material or polymer which decomposes at a temperature lower than 200° C. in an alcohol, to the glass substrate to thereby form a sol film on the glass substrate, (ii) heating the sol film at a temperature not lower than 200° C. to thereby decompose and dissipate the organic polymer and converting the sol film into a porous gel film, (iii) applying a second solution which is a solution of a fluoroalkylsilane compound in an alcohol to the porous gel film to thereby impregnate the porous gel film with the fluoroalkylsilane compound, and (iv) thereafter heating the gel film at a temperature not lower than 500° C.

In this invention typical examples of the metal or metals of the metal oxide film are Si, Ti, Zr and Al.

In performing a sol-gel process by a method according to the invention it is necessary to form a microscopically porous gel film by using an alkoxide or acetylacetonato solution containing an easily decomposable organic polymer such as, for example, polyethylene glycol or hydroxylpropyl cellulose. Then the porous gel film is impregnated with a fluoroalkylsilane compound, which is preferably a fluoroalkyltrimethoxysilane compound such as, for example, $CF_3(CF_2)_3CH_2CH_2Si(OCH_3)_3$. In the porous gel film the fluoroalkylsilane compound is thermally decomposed to leave carbon fluoride in the metal oxide matrix of the finally obtained film.

If a fluoroalkylsilane compound is applied to the glass substrate by using a mixed solution of this compound and a metal alkoxide or acetylacetonato, it is almost impossible to obtain a metal oxide film containing carbon fluoride because when the fluoroalkylsilane compound in an unrestrained state is heated to a temperature above 400° C. it decomposes and dissipates as gaseous substances whereas the final heating for forming a dense metal oxide film needs to be carried out at a temperature not lower than 500° C. The impregnation of the porous gel film with the fluoroalkylsilane compound solves this problem. It is probable that in a water-repellent metal oxide film according to the invention most of carbon fluoride has a structure represented by the formula $CF_n$, where n is from 1 to 3, and chemically bonds to the metal oxide matrix. That is, most of the carbon fluoride is believed to be in the form of $=CF-$, $-CF_2-$ and/or $-CF_3$.

A metal oxide film according to the invention contains carbon fluoride and hence is highly repellent to water. In fact, on this metal oxide film the contact angle of water drop becomes greater than 90 degrees. The water-repellent metal oxide film is good in durability and abrasion or scratch resistance. The invention is applicable to architectural and vehicular window glasses including automobile windshields and rear window glasses to be rubbed with wiper blades.

DESCRIPTION OF THE PREFERRED EMBODIMENTS

In this invention it is not necessary to strictly specify the metal of a metal oxide film, and the metal oxide may be either an oxide of a metal element or a mixed oxide of at least two kinds of metal elements. From a practical point of view it is preferred to make a selection from Si, Ti, Zr and Al because these metals can provide oxide films that are transparent, hard and durable and also because alkoxides or acetylacetonatos of these metals can easily be obtained at relatively low costs.

To form a metal oxide film this invention uses a solution of either an alkoxide of the metal or an acetylacetonato of the metal in an alcohol. The metal alkoxide may be either a simple alkoxide having no organic group other than alkoxyl group, such as methoxide, ethoxide, isopropoxide or isobutoxide, or an alkyl alkoxide having at least one alkyl group besides alkoxyl group, such as monomethylalkoxide or monoethylalkoxide. In a similar sense, the metal acetylacetonato is not necessarily a compound consisting of a metal element and acetylacetone radicals. It is permissible that the acetylacetone radicals are partly substituted, for example, by a methylalkoxyl group, an ethylalkoxyl group or a still different alkylalkoxyl group. A film of a mixed oxide of two kinds of metals can be formed by using a mixed solution of an alkoxide or acetylacetonato of one metal and an alkoxide or acetylacetonato of the other metal.

In the metal alkoxide or acetylacetonato solution the solvent is an alcohol. Usually methyl alcohol, ethyl alcohol, isopropyl alcohol or isobutyl alcohol is used. In the solution the concentration of the metal alkoxide or acetylacetonato (the total concentration in the case of a mixed solution of a plurality of metal compounds) is adjusted so as to fall within the range from 0.01 to 10 wt %. If the concentration is below 0.01 wt % it is difficult to form a uniform coating on a glass substrate by applying the solution. If the concentration is above 10 wt % the solution becomes too viscous and hence cannot easily be applied to a glass substrate by an ordinary coating method. Preferably the concentration is adjusted within the range from 0.1 to 5 wt %.

The alkoxide or acetylacetonato solution needs to contain an organic polymer which is soluble in the alcohol used as the solvent and can be decomposed to gaseous substances at a temperature lower than 200° C. As such a polymer it is preferred to use polyethylene glycol, hydroxylpropyl cellulose or polyacrylic acid. The polymer is added primarily for the purpose of forming a porous gel film by using the solution. That is, when a sol film formed by applying the solution to a glass substrate is heated the polymer decomposes to gases which exhale from the film, whereby the obtained gel film becomes porous. When the gel film is subsequently treated with a solution of a fluoroalkylsilane compound the pores serve the purpose of retaining that compound in the film. Besides, in the solution the polymer serves as a viscosity adjusting agent.

In the metal alkoxide or acetylacetonato solution the amount of the organic polymer must be at least 1 wt % of the metal compound calculated as oxide, i.e. at least 1 wt % of the metal oxide to be formed from the entirety of the metal alkoxide or acetylacetonato in the solution, to accomplish the above explained purpose. It is preferable that the polymer amounts to at least 5 wt % of the metal compound calculated as oxide. The maximum amount of the polymer is limited to 30 wt % of the metal compound calculated as oxide. If a larger amount of a polymer is used the aforementioned gel film becomes too high in porosity and too large in pore size to surely retain the aforementioned fluoroalkylsilane compound in the film, and the finally obtained oxide film may have open pores.

To form a water-repellent metal oxide film by introducing carbon fluoride into the film, a solution of a fluoroalkylsilane compound in an alcohol is used. As the fluoroalkylsilane compound it is preferred to use a fluoroalkyltrimethoxysilane compound such as $CF_3CH_2CH_2Si(OCH_3)_3$, $CF_3(CF_2)_3CH_2CH_2Si(OCH_3)_3$, $CF_3(CF_2)_5CH_2CH_2Si(OCH_3)_3$, $CF_3(CF_2)_7CH_2CH_2Si(OCH_3)_3$ or $CF_3(CF_2)_7CH_2CH_2SiCH_3(OCH_3)_2$, or a partial hydrolysate of such a fluoroalkyltrimethoxysilane compound. In the solution the concentration of the fluoroalkylsilane compound must be at least 0.7 wt % to afford sufficient water repellency to the metal oxide film. There is no strict upper limit to the concentration, but it is in vain to make the concentration higher than 5 wt % because the water repellency of the metal oxide film is no longer enhanced by so increasing the concentration. As the solvent, methyl alcohol, ethyl alcohol, isopropyl alcohol or isobutyl alcohol is usually used.

A metal oxide film according to the invention is formed on a glass substrate by the following process.

First, a metal alkoxide or acetylacetonato solution containing an organic polymer is applied to the glass substrate by a suitable coating method such as dip coating, spraying, brushing, flow coating or spin coating, and the sol film on the glass substrate is heated at a temperature not lower than 200° C. By this heating the sol film turns into a gel film which is porous as a result of the decomposition and dissipation of the organic polymer contained in the sol film. If the heating temperature is lower than 200° C. the dissipation of the organic polymer will be incomplete.

Next, a fluoroalkylsilane compound solution is applied to the porous gel film by a suitable coating method. The gel film is well impregnated with the solution since the solution intrudes into the pores in the gel film, and in the pores the fluoroalkylsilane compound chemically bonds to the inner surfaces of the gel film defining the pores. The thus treated gel film is heated at a temperature not lower than 500° C. By this heating the gel film turns into a dense and hard metal oxide film which contains carbon fluoride. If the heating temperature is below 500° C. the obtained oxide film will be insufficient in hardness and durability.

EXAMPLES 1-6

In these examples an alcohol solution of silicon methoxide was used as the first solution for a method according to the invention. As shown in Table 1—1, the concentration of silicon methoxide (Si-Me) was 0.01 wt % or 2.0 wt %. The solution contained hydroxypropyl cellulose (HPC) which amounted to 5.0 wt % of silicon methoxide (calculated as silicon oxide) in the solution. As the second solution an alcohol solution of either $CF_3(CF_2)_3CH_2CH_2Si(OCH_3)_3$ or $CF_3(CF_2)_7CH_2CH_2Si(OCH_3)_3$ was used as shown in Table 1-1, wherein "$CF_3(CH_2)_3sil$" represents the former compound and "$CF_3(CH_2)_7sil$" the latter compound. In every case the concentration of the second solution was 5.0 wt %.

A glass substrate was degreased and washed with acetone and alcohol, and dried. The glass substrate was immersed in the first solution of silicon methoxide and HPC and slowly drawn up from the solution to thereby form a sol film on the glass substrate. The wet substrate was heated for 10 min in an electric furnace maintained at a predetermined temperature which ranged from 240° to 300° C. as shown in Table 1-1. As the result the sol film turned into a porous gel film. Next, the glass substrate was immersed in the second solution and slowly drawn up from the solution to thereby impregnate the gel film with the fluoroalkyltrimethoxysilane compound. The wet substrate was dried and then heated for 10 min in an electric furnace maintained at a constant temperature of 500° C. As the result the gel film turned into a dense and hard film of silicon oxide.

In every example the obtained silicon oxide film contained carbon fluoride. As evidence, Auger electron spectroscopy (AES) analysis of a surface layer of the obtained silicon oxide film indicated the existence of C.F.

EXAMPLES 7-30

In repeating the two-stage coating and heating process of Examples 1-6, changes were made in the following points. The particulars of the respective examples are shown in Tables 1-1 and 1-2.

As the principal solute of the first solution, silicon monomethylmethoxide (Si-Mt-Me), silicon ethoxide (Si-E), silicon isobutoxide (Si-isoB), an equimolecular mixture of silicon ethoxide and zirconium acetylacetonato (Zr-AA) and an equimolecular mixture of silicon methoxide and titanium methoxide (Ti-Me) were selectively used. As the polymer in the first solution, polyethylene glycol (PEG) was used in Examples 10-30 except Example 28 in which polyacrylic acid (PA) was used. There was no change in the duration of the first heating (10 min) to form a porous gel film.

The solute of the second solution was always $CF_3(CF_2)_3CH_2CH_2Si(OCH_3)_3$ or $CF_3(CF_2)_7CH_2CH_2Si(OCH_3)_3$, though the concentration was changed in some examples. After the treatment of the porous gel film with the second solution the film was heated at 500° C. or 550° C. for 10 min, or at 600° C. for 5 min.

In every example a dense and hard metal oxide film was formed on the glass substrate, and it was evident that the oxide film contained carbon fluoride since AES analysis of a surface layer of the film indicated the existence of C.F.

COMPARATIVE EXAMPLE 1

A silicon oxide film was formed on a glass substrate by coating the substrate with an alcohol solution of silicon methoxide and heating the coated glass substrate at 550° C. for 10 min. Naturally the oxide film contained no fluorine matter.

COMPARATIVE EXAMPLES 2-4

A glass substrate was coated with a mixed solution of titanium methoxide and silicon methoxide or zirconium acetylacetonato, as shown in Table 1-2, in alcohol. In every case no organic polymer was added to the solution. After drying the sol film an alcohol solution of $CF_3(CF_2)_7CH_2CH_2Si(OCH_3)_3$ was applied to the film, and the glass substrate was heated at 400° C. for 2 min or at 600° C. for 5 min as shown in Table 1-2. The oxide film of Comparative Example 4 did not contain carbon fluoride. The oxide films of Comparative Examples 2 and 3 contained some carbon fluoride, but in these oxide films a considerable portion of the fluoroalkyltrimethoxysilane compound remained undecomposed or only partly decomposed.

On each of the oxide films of Examples 1-30 and Comparative Examples 1-4 the contact angle of water drop was measured. The results are shown in Tables 1-1 and 1-2.

Further, the durability of each oxide film was evaluated by an endurance test using a practical wiper blade for an automobile window. Under load of 500 g the wiper blade was kept in tight contact with the oxide film on the glass substrate and moved reciprocatively until it made 100000 (hundred thousand) successive rubbing passes. In this test no liquid was applied to the oxide film surface. The degree of durability of the oxide film was valued by the amount of a change in the contact angle of water drop from the contact angle before the endurance test. In the column of "Durability" in Tables 1-1 and 1-2: "A" means that the change in the contact angle was less than 10°; "B" means that the change was not less than 10° but was less than 20°; and "C" means that the change was not less than 20°.

After the above endurance test, every oxide film was observed with an optical microscope of 200 magnifications to judge the degree of scratch resistance of the oxide film. In the column of "Scratch Resistance" in Tables 1-1 and 1-2: "A" means that no scratch was found in any region of the area rubbed by the wiper blade; "B" means that scratches were found only in the marginal regions of the rubbed area where the wiper blade made turns; and "C" means that scratches were found over the entire region of the rubbed area.

Finally the grade of every oxide film was evaluated by collectively considering the contact angle of water drop, the degree of durability and the degree of scratch resistance. In the column of "Grade" in Tables 1-1 and 1-2: "A" means "excellent"; "B" means "good"; and "C" means "not good".

TABLE 1-1

| | First Solution | | | | Second Solution | | Heating Temperature (°C.) | | Oxide Film | | | |
| | Metal Compound (wt %) | | Polymer (wt %) | | Fluoroalkyl-silane (wt %) | | 1st stage | 2nd stage | Contact Angle (°) | Durability | Scratch Resistance | Grade |
|---|---|---|---|---|---|---|---|---|---|---|---|---|
| Ex. 1 | Si-Me | (0.01) | HPC | (5.0) | $CF_3(CF_2)_3$sil | (5.0) | 240 | 500 | 114 | B | B | B |
| Ex. 2 | " | " | " | " | " | " | 280 | " | 117 | B | B | B |
| Ex. 3 | " | " | " | " | $CF_3(CF_2)_7$sil | (5.0) | 300 | " | 113 | B | B | B |
| Ex. 4 | " | (2.0) | " | " | " | " | 240 | " | 115 | B | B | B |
| Ex. 5 | " | " | " | " | $CF_3CF_2)_3$sil | (5.0) | 280 | " | 116 | B | B | B |
| Ex. 6 | " | " | " | " | " | " | 300 | " | 110 | B | B | B |
| Ex. 7 | Si-Mt-Me | (5.0) | " | " | $CF_3(CF_2)_7$sil | (5.0) | 240 | " | 110 | B | B | B |
| Ex. 8 | " | " | " | " | " | " | 280 | " | 114 | B | B | B |
| Ex. 9 | " | " | " | " | " | " | 300 | " | 107 | B | B | B |
| Ex. 10 | Si-E | (5.0) | PEG | (5.0) | $CF_3(CF_2)_3$sil | (0.7) | 280 | 550 | 108 | B | A | A |
| Ex. 11 | " | " | " | " | " | " | 300 | 600 | 101 | B | A | A |
| Ex. 12 | " | " | " | " | " | " | 280 | 550 | 112 | B | A | A |
| Ex. 13 | " | " | " | " | " | " | 300 | 600 | 105 | B | A | A |
| Ex. 14 | " | (2.0) | " | (10.0) | " | (2.0) | 280 | 550 | 113 | B | A | A |
| Ex. 15 | " | " | " | " | " | " | 280 | 600 | 110 | B | A | A |
| Ex. 16 | " | " | " | " | " | " | 300 | 550 | 112 | B | A | A |
| Ex. 17 | " | " | " | " | " | " | 300 | 600 | 108 | B | A | A |
| Ex. 18 | Si-isoB | (5.0) | " | (30.0) | $CF_3(CF_2)_7$sil | (5.0) | 280 | 550 | 113 | B | A | A |
| Ex. 19 | " | " | " | " | " | " | 280 | 600 | 102 | B | A | A |
| Ex. 20 | " | " | " | " | " | " | 300 | 550 | 114 | B | A | A |
| Ex. 21 | " | " | " | " | " | " | 300 | 600 | 108 | B | A | A |

TABLE 1-2

| | First Solution | | | | Second Solution | | Heating Temperature (°C.) | | Oxide Film | | | |
|---|---|---|---|---|---|---|---|---|---|---|---|---|
| | Metal Compound (wt %) | | Polymer (wt %) | | Fluoroalkyl-silane (wt %) | | 1st stage | 2nd stage | Contact Angle (°) | Durability | Scratch Resistance | Grade |
| Ex. 22 | Si-E + Zr-AA | (0.01) | PEG | (10.0) | CF₃(CF₂)₇sil | (0.7) | 280 | 500 | 110 | A | B | A |
| Ex. 23 | " | " | " | " | " | " | " | 550 | 107 | A | A | A |
| Ex. 24 | " | " | " | " | " | " | " | 600 | 101 | A | A | A |
| Ex. 25 | " | (5.0) | " | (30.0) | " | (5.0) | " | 500 | 113 | A | B | A |
| Ex. 26 | " | " | " | " | " | " | " | 550 | 111 | A | A | A |
| Ex. 27 | " | " | " | " | " | " | " | 600 | 103 | A | A | A |
| Ex. 28 | Si-Me + Ti-Me | (3.0) | PA | (10.0) | " | " | " | 500 | 110 | B | B | B |
| Ex. 29 | " | " | PEG | (10.0) | " | " | " | 550 | 106 | A | B | A |
| Ex. 30 | " | " | " | " | " | " | " | 600 | 100 | A | A | A |
| Comp. Ex. 1 | Si-E | (3.0) | — | — | — | — | — | 550 | 25 | — | — | C |
| Comp. Ex. 2 | Si-Me + Ti-Me | (3.0) | — | — | CF₃(CF₂)₇sil | (0.25) | — | 400 | 115 | C | C | C |
| Comp. Ex. 3 | Zr-AA + Ti-Me | (4.0) | — | — | " | " | — | 400 | 109 | C | C | C |
| Comp. Ex. 4 | Si-Me + Ti-Me | (3.0) | — | — | " | " | — | 600 | 30 | — | — | C |

What is claimed is:

1. A method of forming a water-repellent metal oxide film on a glass substrate, the method comprising the steps of:
    applying a first solution, which is a solution of at least one metal oxide precursor selected from the group consisting of metal alkoxides and metal acetylacetonatos and an organic polymer which decomposes at a temperature lower than 200° C. in an alcohol, to the glass substrate to thereby form a sol film on the glass substrate;
    heating said sol film at a temperature not lower than 200° C. to thereby decompose and dissipate said organic polymer and converting said sol film into a porous gel film;
    applying a second solution which is a solution of a fluoroalkylsilane compound in an alcohol to said porous gel film to thereby impregnate the porous gel with said fluoroalkylsilane compound; and
    heating the gel film impregnated with said fluoroalkylsilane compound at a temperature not lower than 500° C.

2. A method according to claim 1, wherein said at least one metal oxide precursor is selected from the group consisting of alkoxides of Si, Ti, Zr and Al and acetylacetonatos of Si, Ti, Zr and Al.

3. A method according to claim 1, wherein said first solution comprises a silicon alkoxide.

4. A method according to claim 3, wherein said first solution further comprises a titanium alkoxide.

5. A method according to claim 3, wherein said first solution further comprises zirconium acetylacetonato.

6. A method according to claim 1, wherein the concentration of said at least one metal oxide precursor in said first solution is in the range from 0.01 to 10 wt %.

7. A method according to claim 6, wherein said concentration is in the range from 0.1 to 5 wt %.

8. A method according to claim 6, wherein the concentration of said organic polymer in said first solution is in the range from 1 to 30 wt % of said at least one metal oxide precursor calculated as metal oxide.

9. A method according to claim 8, wherein said concentration of said organic polymer is not lower than 5 wt %.

10. A method according to claim 8, wherein said organic high molecular material is selected from the group consisting of polyethylene glycol, hydroxypropyl cellulose and polyacrylic acid.

11. A method according to claim 1, wherein said fluoroalkylsilane compound is a fluoroalkyltrimethoxysilane compound selected from the group consisting of
$CF_3CH_2CH_2Si(OCH_3)_3$,
$CF_3(CF_2)_3CH_2CH_2Si(OCH_3)_3$,
$CF_3(CF_2)_5CH_2CH_2Si(OCH_3)_3$,
$CF_3(CF_2)_7CH_2CH_2Si(OCH_3)_3$ and
$CF_3(CF_2)_7CH_2CH_2SiCH_3(OCH_3)_2$, 12. A method according to claim 11, wherein the concentration of said fluoroalkylsilane compound in said second solution is in the range from 0.7 to 5 wt %.

13. A method according to claim 1, wherein said alcohol in said first solution and said alcohol in said second solution are selected from the group consisting of methnol, ethanol, isopropanol and isobutanol.

* * * * *